United States Patent [19]

Kaufman et al.

[11] Patent Number: 4,945,010
[45] Date of Patent: Jul. 31, 1990

[54] COOLING ASSEMBLY FOR FUEL CELLS

[75] Inventors: Arthur Kaufman, West Orange; John Werth, Princeton, both of N.J.

[73] Assignee: Engelhard Corporation, Edison, N.J.

[21] Appl. No.: 896,329

[22] Filed: Aug. 13, 1986

Related U.S. Application Data

[63] Continuation of Ser. No. 500,498, Jun. 2, 1983, abandoned.

[51] Int. Cl.$^5$ .............................................. H07M 8/04
[52] U.S. Cl. ..................................... 429/26; 165/172; 165/177
[58] Field of Search .................. 429/26, 120; 165/172, 165/177

[56] References Cited

U.S. PATENT DOCUMENTS

| | | | |
|---|---|---|---|
| 2,347,957 | 5/1944 | McCullough | 165/172 |
| 2,820,615 | 1/1958 | Peters | 165/169 |
| 2,864,591 | 12/1958 | Frink | 165/177 |
| 2,927,625 | 3/1960 | Rothermal et al. | 138/131 |
| 3,306,353 | 2/1967 | Burne | 163/172 |
| 3,572,999 | 3/1971 | Sato | 165/177 X |
| 3,964,929 | 6/1976 | Grevstad | 429/26 |
| 4,175,508 | 11/1979 | Togashi | 165/177 X |
| 4,233,369 | 11/1980 | Breault et al. | 429/26 |
| 4,324,844 | 4/1982 | Kothmann | 429/26 |

FOREIGN PATENT DOCUMENTS

| | | |
|---|---|---|
| 166660 | 10/1983 | Japan. |
| 166661 | 10/1983 | Japan. |
| 166663 | 10/1983 | Japan. |

OTHER PUBLICATIONS

Mientek, A. P.; Gas Research Institute: Annual Report, "On Site Fuel Cell Power Plant Technology Development Program" Jul. 1982 pp. vi, 2–43 through 2–50, 3–1 and 3–8.

Primary Examiner—Stephen J. Kalafut

[57] ABSTRACT

A cooling assembly for fuel cells having a simplified construction whereby coolant is efficiently circulated through a conduit arranged in serpentine fashion in a channel within a member of such assembly. The channel is adapted to cradle a flexible, chemically inert, conformable conduit capable of manipulation into a variety of cooling patterns without crimping or otherwise restricting of coolant flow. The conduit, when assembled with the member, conforms into intimate contact with the member for good thermal conductivity. The conduit is non-corrodible and can be constructed as a single, manifold-free, continuous coolant passage means having only one inlet and one outlet.

7 Claims, 6 Drawing Sheets

COOLING ASSEMBLY FOR FUEL CELLS

This is a continuation of co-pending application Ser. No. 500,498, filed on 6/2/83, now abandoned.

BACKGROUND OF THE INVENTION

This invention relates to an improved cooling apparatus, and, more specifically, to an improved cooling assembly for use in fuel cell stacks.

Cross-reference is made to two other copending patent applications pertaining to related subject matter and assigned to the same assignee as this application; application of John Werth entitled "Fuel Cell Crimp-Resistant Coolant Device With Internal Support", Ser. #06/500,464 filed on June 2, 1983, now abandoned, and application of Charles Wittel entitled "Fuel Cell Crimp-Resistant Coolant Device With Internal. Coil" serial #06/500,465, filed on June 2, 1983 now U.S. Pat. No. 4,583,583. These applications are incorporated by reference in their entireties herein.

Fuel cell design and operation typically involves conversion of a hydrogen-containing fuel and some oxidant into DC electric power through an exothermic reaction. The chemistry of this reaction is well known and has established parameters and limitations. One such limitation is that the electrochemical reaction produces, as a by-product thereof, substantial waste heat which must be removed in a controlled manner to maintain the cells at their desired operating temperature. For efficient operation, it is generally desirable to maintain the cells at substantially uniform temperature and at a temperature level which is consistent with a controllable rate of reaction of the fuel cells therein.

Conventional methods for removal of waste heat from the fuel cell environment have traditionally involved the use of a laminar heat exchanger assemblies, or cooling assemblies, incorporated within and arranged parallel to the various other layers from which the fuel cells are constructed. Typically, the components of the cooling assembly take the form of passageways which contain a circulating coolant material. The heat generated within the stack is transferred to the coolant as it is circulated through the stack. The coolant is then brought out of the stack and into a heat exchanger where the heat is removed therefrom before the coolant is recirculated through the stack. In this manner the cooling assembly enables control over the temperature of the reaction environment of the fuel cell stack and, thus, its rate and efficiency. The pattern of distribution of the coolant passageways within the stack, their relative size, the heat capacity of the coolant fluid and the volume of coolant which is circulated through the cooling assembly per unit of time determine the heat transfer capacity of the cooling system. Because the cooling system is generally an integral part of the fuel cell stack, it should be electrically isolated from the stack and also should not be adversely affected by corrosive media within the stack such as the hot electrolyte.

The problems associated with corrosion as well as the undesirable flow of electrical current from the stack into the cooling loop are described in detail in U.S. Pat. Nos. 3,964,929; 3,964,930; and 3,969,145. These patents address the problem of the so-called "shunt currents" and attempt to resolve it by electrically insulating the cooling system from ground. This minimizes the driving potential of such currents relative to the coolant. Other techniques for avoiding the problems associated with shunt currents include the use of dielectric coolants.

The heat exchanger configuration described in these patents is rather typical of that employed by the prior art. Generally, the configuration consists of a series of parallel tubes connected to what is generally referred to as a "plenum". The plenum is a reservoir from which coolant is simultaneously distributed into the parallel tubes which are embedded in a fuel cell cooling assembly. After passage of the coolant through the parallel tubes, it is collected in another plenum and, thereafter, returned, through a cooling loop, to the inlet plenum.

The cooling assembly tubes are composed of electrically conductive material such as copper. Water can be used as the coolant and the metal tubes are coated either on their internal or external surfaces with a dielectric material such as polytetrafluoroethylene. This coating is used to reduce the possibility of shunt currents and corrosion of the tubes. The coated tubes are located in passageways formed in the plates of fuel cells in the stack. However, due to manufacturing tolerances, it is difficult to avoid voids such as spaces between the tubes and the walls of the passageways. Since air is a poor conductor of heat, such air spaces can be filled with a thermally-conductive grease which is compatible with the electrolyte to maximize heat transfer from the cells to the coolant. These systems also use a sacrificial anode material at the tube ends to guard against corrosion. In addition, there is the possibility of discontinuities occurring in the Teflon layer such as by manufacturing imperfections, differential thermal expansion, damage during the assembly process, poor bonding, etc. This causes two problems; first the corrosive media in the fuel cell will be able to directly attack the tube and second, the thermal contact will be diminished.

A variation in cooling assembly design is disclosed in U.S. Pat. No. 4,233,369. In this patent, a fibrous, porous coolant tube holder, which also serves as a member through which a reactant gas can travel, is used to hold copper coolant tubes. The tubes, held in channels in the holder, are connected to a coolant inlet header and coolant outlet header. Between the headers, the tubes pass through the stack, make a U-turn and pass back through the stack. The tubes are pressed into the channels and have caulking between the channel walls and tube. In addition to reduced corrosion, this system makes the separator plate thinner and easier to manufacture.

Other techniques are known for bringing coolant materials into a fuel cell stack. For instance, a tubeless system has been used wherein a metal plate is grooved in a pattern on its surface with one or more inlets and outlets. The grooved surface of the plate is then covered with a second ungrooved metal plate, called a brazing sheet, to create an assembly having enclosed coolant passageways and coolant inlet and outlets. In addition, similar passageways can be constructed by assembling two such brazing plates with partitions therebetween which form coolant passageways.

It is evident that the demands upon the cooling systems for fuel cells are significantly greater and more specialized than those encountered by other devices in different heat transfer environments. U.S. Pat. Nos. 1,913,573; 2,819,731; 2,820,615; 2,864,591; and 3,847,194 are illustrative of some of the conventional heat transfer devices found in areas other than the fuel cell-related technologies. In virtually all the heat exchangers described in the immediately foregoing list of patents, the environmental setting contemplated for their use is much more forgiving than that encountered in fuel cells.

Accordingly, it is a principal object of the invention to provide an improved fuel cell cooling assembly.

It is another object of the invention to provide a cooling assembly that maximizes heat transfer from the fuel cell stack to the coolant without undue manufacturing and assembly tolerances.

It is another object of this invention to provide a manifold-free cooling assembly of simplified construction.

It is another object of the invention to provide a cooling assembly which is essentially non-corrosive in the fuel cell environment.

It is another object of this invention to provide a cooling assembly which avoids shunt currents without the need for additional electrical isolation thereof from adjacent fuel cells within the stack.

It is another object of this invention to provide a cooling assembly that can be an integral component of a fuel cell.

It is another object of the invention to provide a cooling assembly that avoids coatings.

SUMMARY OF THE INVENTION

The fuel cell cooling assembly described herein utilizes a conformable conduit for carrying coolant through the assembly. The conduit is held by a member or members containing channels which, upon assembly with the conduit, conform the conduit into intimate contact with the surface of the channels to maximize heat transfer from the fuel cell to the coolant.

In one embodiment, the conduit can comprise a non-corroding, metal-free, dielectric material. The conduit can also be a continuous tube having periodic corrugations therein to accommodate the bends necessary to arrange the conduit into a serpentine configuration to maximize heat transfer in a given area while necessitating only one inlet and one outlet for the coolant.

In another embodiment, the cooling assembly can be used in a stack of discrete fuel cells in which two of the discrete adjacent cells are separated from one another by a manifold-free heat exchanger assembly comprising a termination plate from each of the adjacent cells which, in combination, form a predetermined channel pattern to intimately cradle a continuous, non-corrodible, crimp-resistant, electrically insulated conduit.

BRIEF DESCRIPTION OF THE DRAWINGS

This invention will now be described by reference to the following drawings and description in which like elements have been given common reference numerals:

FIG. 8 a–c are schematic illustrations of the coolant tube and the grooves at various times.

DETAILED DESCRIPTION OF THE PREFERRED EMBODIMENT

Figure 1:
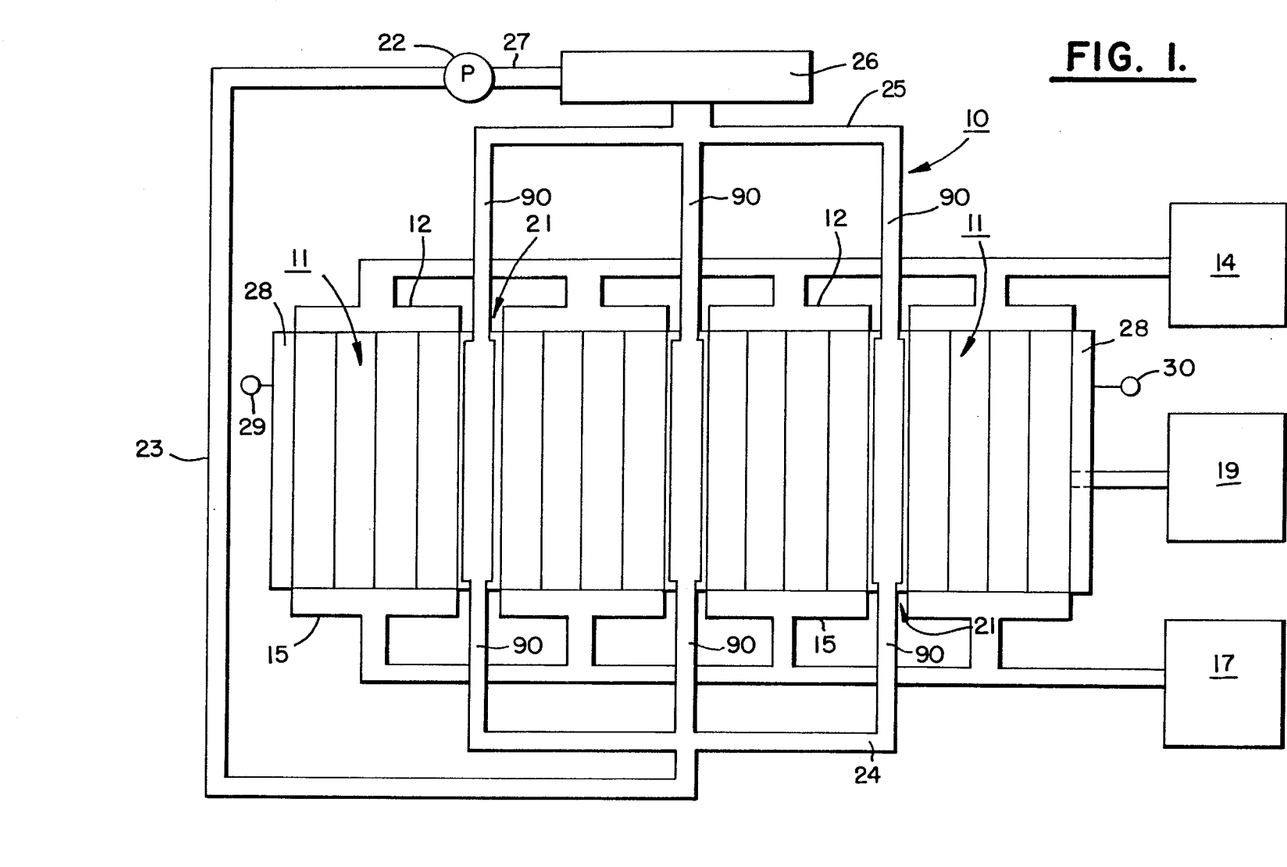
FIG. 1 is a schematic representation of a fuel cell assembly comprising a plurality of stacked fuel cells with intermediate cooling plates and terminal current collecting plates.
Figure 2:
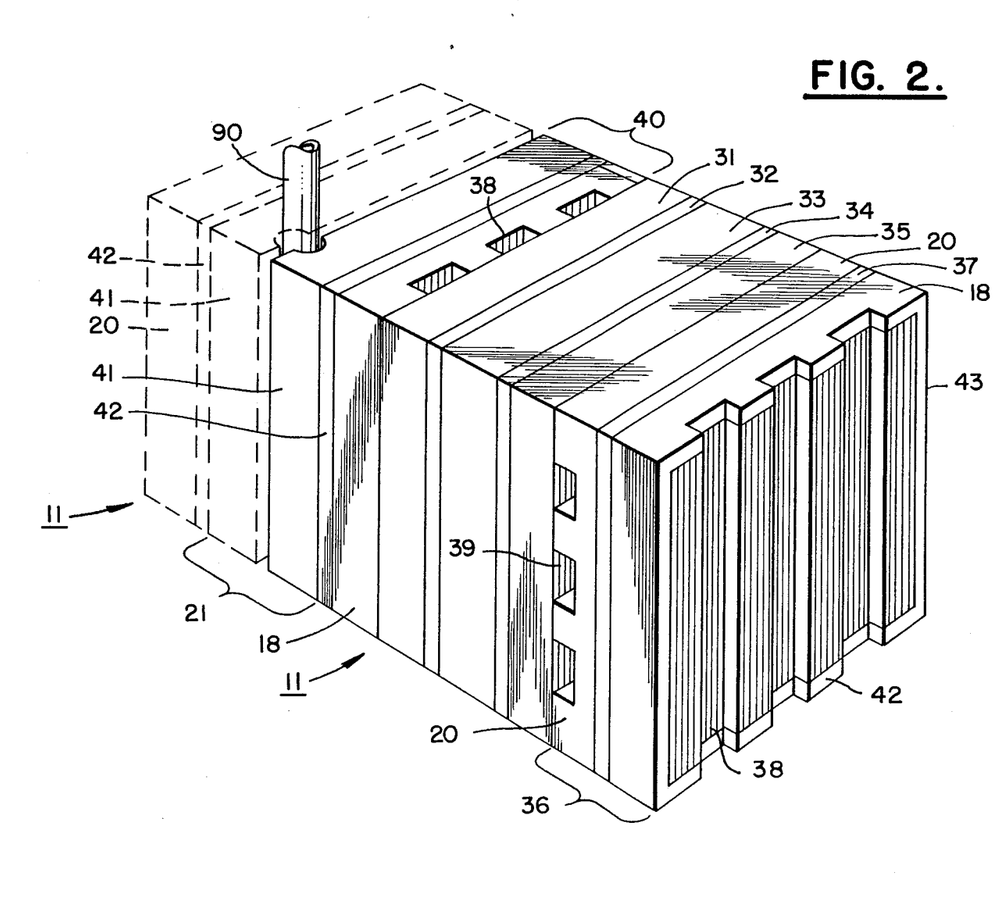
FIG. 2 is a perspective view of a portion of the fuel cell assembly of FIG. 1, illustrating an individual fuel cell in greater detail.

An exemplary fuel cell stack assembly 10 employing the invention is shown in FIGS. 1 and 2. The stack assembly 10 includes a plurality of fuel cells 11. Hydrogen gas input manifolds 12 are arranged along one side of the stack assembly 10. Although a plurality of manifolds 12 are shown for each group of fuel cells 11, a single such manifold arrangement could be used if desired. The manifolds 12 are connected to a source of hydrogen gas 14. Hydrogen gas collecting manifolds 15 are arranged along the opposing stack side in correspondence with the hydrogen gas input manifolds 12. Here again, although a plurality of manifolds 15 are shown, a single such manifold could be used if desired. The collecting manifolds 15 are connected to a hydrogen gas discharging or recirculating system 17. The hydrogen gas from the input manifolds 12 flows through gas distribution plates 18 to the collecting manifolds 15.

In similar fashion, a plurality of oxygen input manifolds (not shown) are arranged along another stack side connecting the one stack side and the opposing stack side. These oxygen manifolds are connected to an oxygen source 19. The oxygen may be supplied in the form of air rather than pure oxygen if desired. A plurality of oxygen collecting manifolds (not shown) are arranged along the stack side opposing the stack side having the oxygen input manifolds connecting the respective one stack side and opposing stack side. The stack sides at which the oxygen manifolds are arranged are generally stack sides other than the ones at which the hydrogen input manifold and hydrogen collecting manifold are connected. The oxygen manifolds are also connected to an oxygen storage or recirculating system (not shown). The oxygen from the input manifolds flows through the oxygen gas distribution plates 20 to the respective collecting manifolds.

Cooling assemblies 21 are arranged periodically between adjacent fuel cells 11 to effect the desired degree of cooling. In the embodiment shown in FIG. 1, three cooling assemblies 21 are shown arranged intermediate each group of four cells 11. The cooling material, either liquid or gas, which flows through the cooling assembly 21 can be any suitable material. For instance, it can be a dielectric fluid such as a high temperature oil coolant manufactured by Multitherm Corporation under the trade name PG-1. In the alternative, it can be a non-dielectric coolant such as water or water & stream mixtures.

A pump 22 circulates the coolant by way of passageway 23 and distribution reservoir 24 into the respective cooling assemblies 21. The distribution reservoir 24 is joined to each individual cooling assembly by direct connection to the inlet port of the continuous coolant conduit 90 of cooling assembly 21. Conduit 90 is shown in two different configurations in FIGS. 3(a) and 3(b). After passing through conduit 90, the coolant flows into the collection reservoir 25. The reservoir 25 is connected to a heat exchanger 26 which reduces the temperature of the coolant to the desired input temperature before it is recirculated through the conduit 90. Collection reservoir 25 is joined to the cooling plate assemblies 21 by direct connection to the outlet port of continuous conduit 90. A coolant passageway 27 connects the heat exchanger 26 back to the pump 22 so that the coolant can be recirculated through the respective cooling assemblies 21.

Reservoirs 24 and 25, referred to hereinabove, are ordinarily only present when the fuel cell stack 10 has a number of cooling assemblies 21, and even then the reservoirs are connected directly to each individual cooling assembly 21 at a single point. Alternatively, however, cooling assembly designs could be made wherein more than one continuous conduit 90 operates in parallel to effect serial distribution of coolant throughout the plate or wherein such multiple continuous conduits are complementary to one another and each independently distributes coolant throughout the plate.

The fuel cells 11 and the cooling assemblies 21 are basically electrically conductive so that when they are stacked as shown, the fuel cells 11 are connected in series. In order to connect the stack assembly 10 to a desired electrical load, current collecting plates 28 are employed at the respective ends of the stack assembly 10. Positive terminal 29 and negative terminal 30 are connected to the current collecting plates 28 as shown and may be connected to the desired electrical load by any conventional means.

Any suitable fuel cell design can be utilized with the cooling assembly disclosed herein. FIG. 2 depicts a cooling assembly 21 together with portions of a representative fuel cell stack shown in more detail. This figure includes two portions of the stack immediately surrounding cooling assembly 21. Each of the stack portions includes in this embodiment, a plurality of fuel cell units 11. The stack portion to the right of the cooling assembly 21 (in solid lines) shows detail of the various components of the cell 11. The stack portion to the left of cooling assembly 21 (in dotted lines) is representative of another similar fuel cell. Although the portion of the stack in dotted lines is shown slightly removed from the portion in solid lines for clarity, it is understood that these two portions are in contact with each other and conduit 90 in actual operation to provide good electrical and thermal conductivity through the two portions.

Each fuel cell 11, as depicted in FIG. 2 includes a hydrogen gas distribution plate 18 and an oxygen or air distribution plate 20. Arranged intermediate between the respective gas distribution plates 18 and 20 are the following elements starting from the hydrogen gas distribution plate 18; anode 31, anode catalyst 32, electrolyte 33, cathode catalyst 34 and cathode 35. These elements 31-35 of the fuel cell 11 may be formed of any suitable material in accordance with conventional practice.

The hydrogen gas distribution plate 18 is arranged in contact with the anode 31. Typically, the anode comprises a carbon material having pores which allow the hydrogen fuel gas to pass through the anode to the anode catalyst 32. The anode 31 is preferably treated with Teflon (polytetrafluoroethylene) to prevent the electrolyte 33, which is preferably an immobilized acid, from flooding back into the area of the anode. If flooding were allowed to occur, the electrolyte would plug up the pores in the anode 31 and lessen the flow of hydrogen fuel through the fuel cell 11. The anode catalyst 32 is preferably a platinum containing catalyst.

The fuel cell 11 is formed of an electrically conductive material, such as a carbon based material, except for the electrolyte layer which does not conduct electrons but does conduct hydrogen ions. The various elements, 18, 31-35, and 20 are compressed together under a positive pressure during the cell assembly process. The electrolyte 33 can be made of any suitable material such as phosphoric acid. The acid can be dispersed in a gel or paste matrix so that it is immobilized and not a free liquid. An exemplary electrolyte matrix could comprise a mixture of phosphoric acid, silicon carbide particles and Teflon particles. The cathode catalyst 34 and the cathode 35 can be formed of materials similar to the anode catalyst 32 and anode 31.

All of the elements of the fuel cell 11 are arranged after assembly in intimate contact as shown in FIG. 2. In order to provide a relatively compact electrically interconnected stack assembly of a plurality of adjacent individual fuel cells 11, the bi-polar assembly 36 is used to easily connect together adjacent fuel cells 11. The bi-polar assembly 36 is comprised of a hydrogen gas distribution plate 18 and an oxygen or air distribution plate 20 with the impervious interface layer of plate 37 arranged between them. Therefore, the bi-polar assembly 36 is comprised of the hydrogen gas distribution plate 18 of one cell 11 and the oxygen or air gas distribution plate 20 of the next adjacent cell 11. The interface layer, or plate 37, may comprise an impervious carbon plate or any other conventional interface as may be desired. The bi-polar assembly 36, the plates 18 and 20 and the interface 37 therebetween are securely connected together as a unit so as to have good electrical conductivity.

In order to facilitate the gas flow in the gas distribution plates 18 and 20, respective channels or grooves 38 or 39 are employed. The grooves 38 in the hydrogen gas distribution plate 18 are arranged orthogonally or perpendicularly to the grooves 39 in the oxygen or air gas distribution plate 20. This allows the grooves to be easily connected to respective input and output manifolds 12 and 15, for example, on opposing sides of the cell stack assembly 10. Although grooves within a particular plate, such as plates 18 or 19, are shown as extending in a unidirectional manner in FIG. 2, there can be cross-channels made between these grooves to aid in the distribution of the fluidic reactants. When such cross-channels are utilized, the primary flow of reactants is still in the direction of the grooves 38 and 39 as shown in FIG. 2; that is, in the direction that the reactants flow between the reactant input and collecting manifolds.

The gas distribution plates 18 and 20 supply the respective hydrogen and oxygen or air gases to the surfaces of their respective anode 31 or cathode 35. In order to more evenly distribute the respective gases at the anode 31 or cathode 35 plate surfaces, the gas distribution plates 18 and 20 are preferably formed of a porous carbon material. This allows the gases to flow through the pores of the plates 18 and 20 between the channels 38 or 39 to provide more uniform gas distribution over the face of the respective anode 31 or cathode 35.

At the ends of the stack, as seen in FIG. 1, there are current collecting plates 28. These can be made an integral part of the adjacent gas distribution plate assembly on the end cell in the stack. Optionally, an impervious material, such as aluminum, can be placed between the gas distribution plate and current collecting plate or the current collecting plate itself can be made of such a material.

Figure 3A:
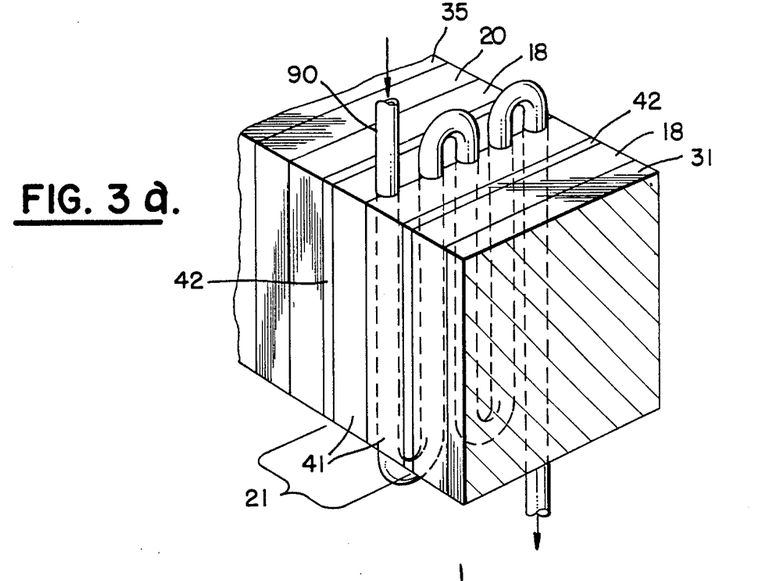
FIGS. 3(a) & 3(b) are a perspective view showing two embodiments of the cooling assembly.
Figure 3B:
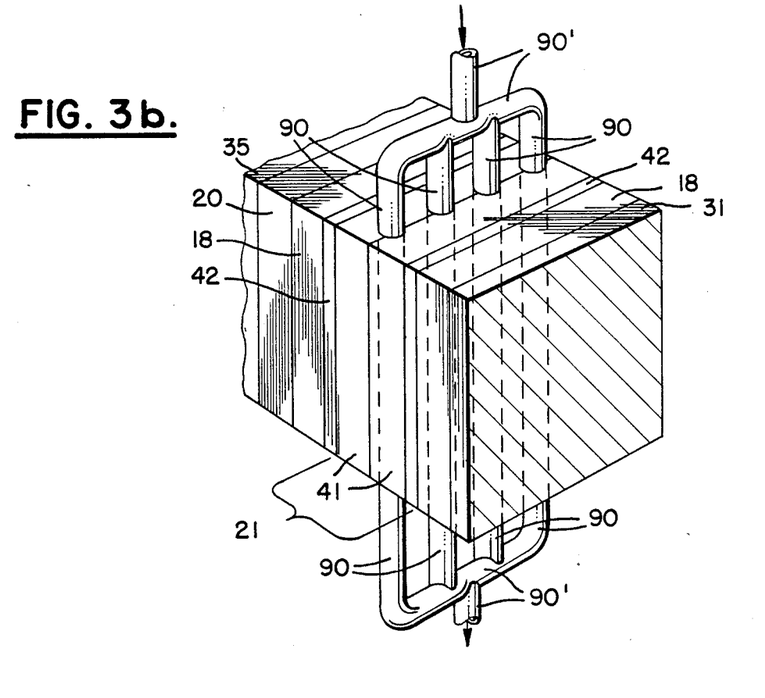
Figures 4A, 4B:
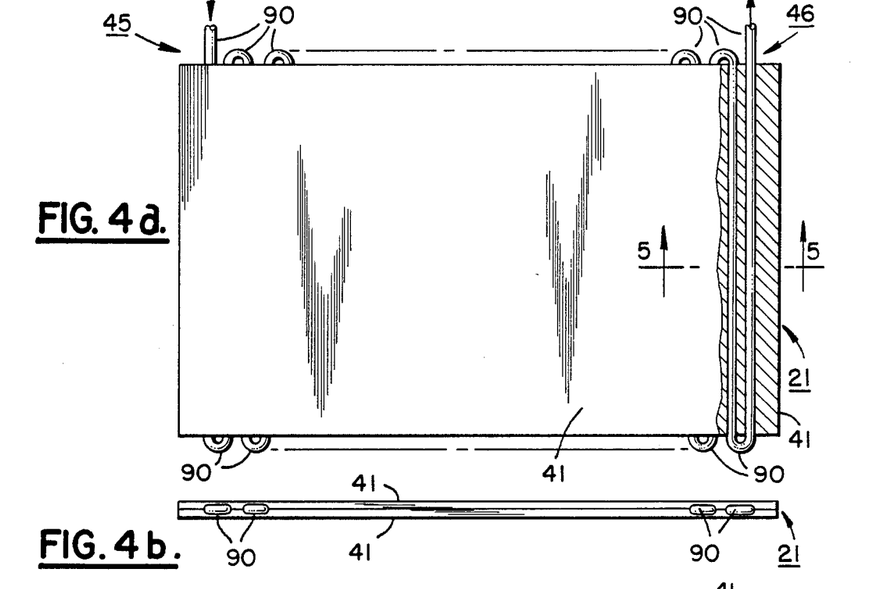
FIG. 4(a) is a view in partial cross section of a cooling assembly which has been isolated from the fuel cell assembly illustrating the serpentine arrangement of conduit means as it weaves through the predetermined channel pattern formed in the members which retain the conduit means.
FIG. 4(b) is a top view of FIG. 4(a).

The cooling assembly 21, as shown in FIG. 2 and also FIGS. 4(a) and 4(b), has at least one coolant conduit means such as conformable tube 90. The conduit carries coolant through the cooling assembly 21. The cooling assemblies 21 shown in FIGS. 3-5 include a means for holding the conduit tube 90 in the assemblies including a member or plate 41. The member 41, when assembled with the conduit tube, conforms at least a portion of the conduit tube into intimate contact with the member 41.

The embodiment of the cooling assembly 21 shown in FIG. 2 includes the member 41 as an integral part of the gas distribution assembly 40. The assembly 40 includes hydrogen gas distribution plate 18 and a gas impervious plate 42, which is optional, assembled together with the member 41. A similar assembly is shown in dotted lines on the left side of tube 90, except that the oxygen gas distribution plate 20 is made an integral part of the assembly. The gas distribution plates 18 & 20 could alternatively be film bonded directly onto member 41.

The improved cooling assembly 21 can take several embodiments, two of which are shown in more detail in FIGS. 3(a) and 3(b). In a first embodiment shown in FIG. 3(a), conduit 90 is a single, continuous tube having one inlet and one outlet for coolant. The tube is arranged in a serpentine or similar pattern within members 41 to effect good heat transfer between the members 41 and the tube 90. Although the tube 90 is shown as having its turning bends outside members 41 to sweep back and forth across members 41, the turning bends can alternatively be placed within the members 41. In a second embodiment shown in FIG. 3(b), conduit 90 is actually a plurality of conduit tubes 90 passing through the members 41. Coolant, in this latter embodiment, is brought in and exited through a manifold comprising conduit feeders or headers 90' so that all conduits 90 can be fed off a single conduit feeder.

The embodiment shown in FIG. 3(a) is the preferred one. This is the manifold-free arrangement which is simpler and less expensive to manufacture and assemble as compared to the arrangement shown in FIG. 3(b). The phrase "manifold-free" is intended as descriptive of a heat exchanger in which a coolant is distributed from the portion of the cooling loop which is remote from the fuel cells directly into the cooling assembly so as to provide for serial flow of coolant throughout the cooling assembly. This is in sharp contrast to the devices illustrated in the prior art whereby coolant is simultaneously distributed from a common manifold into a plurality of parallel, and highly localized, channels of the cooling plate which is served by each of these individual unconnected coolant paths.

As can be readily appreciated, the phrase "manifold-free" is not, however, intended as exclusive of a coolant distribution system wherein coolant from a common source is simultaneously distributed into two or more continuous channels or conduits arranged in parallel, or otherwise, within the cooling assembly. The coolant flow in this latter type system would not be of the highly localized nature as in the prior art, but rather would and could provide (a) a redundant coolant flow pattern, (b) two or more patterns which are complementary to one another, or (c) a coolant flow pattern in which the direction of flow in one channel is counter-current to the flow in the other. In any event, this predetermined pattern of distribution of a second continuous channel/conduit would not be highly localized as is dictated by the prior art systems in which a manifold is an essential element for the simultaneous distribution of coolant through such unconnected localized channels.

In the event a corrosion sensitive material is used in the fabrication of this cooling assembly, it should be effectively isolated from the electrolyte and other hostile chemical agents. In the most preferred embodiments of this invention, the cooling assembly is essentially metal-free; that is, none of the components thereof which are actually or potentially exposed to the corrosive environment of the fuel cell are composed of a corrosive material such as metal. For example, conduit 90 is preferably a fluorinated hydrocarbon polymer. In fuel cells, the gas distribution plates, such as 18 and 20 in FIG. 2, are commonly made of a porous carbon material. To protect the members 41 from corrosion, an improved interfacial layer configuration can be used between members 41 and gas distribution plates 18 and 20 to replace gas impervious plate 42. This interfacial configuration is described in the copending U.S. patent application Ser. #06/430,148, filed on Sept. 30, 1982 entitled "Film-Bonded Fuel Cell Interface Configuration", invented by A. Kaufman and P.L. Terry, which is incorporated herein by reference in its entirety.

Figure 5:
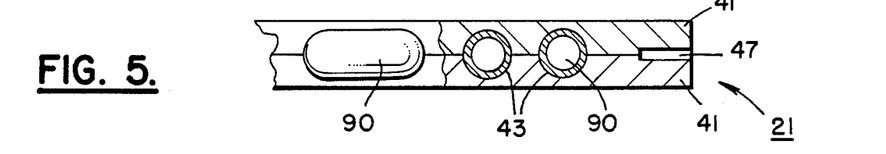
FIG. 5 is a cross section through FIG. 4 at Section A—A.

FIGS. 4(a), and 4(b) and 5 show further views of the cooling assembly 21. In this embodiment, the cooling assembly 21 consists of conformable coolant conducting means, the tube 90, for carrying coolant through the cooling assembly. Coolant is brought in through one end of the tube 90, the inlet 45, and removed from the assembly at the other end of tube 90, the outlet 46. A means similar to that described in FIG. 1 is used to circulate the coolant through the cooling assembly. The coolant assembly is located adjacent a cell or between two adjacent cells in a fuel cell stack as shown in FIG. 1. The cooling apparatus includes a means for holding the tube 90, in this embodiment shown as members 41. The member 41 has means therein for holding the tube 90 such as channels 43 shown in FIG. 5. When the members 41 are assembled together with the tube 90, at least a portion of the tube 90, and particularly the surface area of the tube, conforms to make intimate contact with the member 41.

The conduit means, the tube 90, is preferably non-corrodible and metal-free. The tube 90 can be made of any suitable material such as a dielectric material. One material suitable for this purpose is polytetrafluoroethylene (Teflon). Thus, tube 90 can be a Teflon tube having about a 0.270 inch outside diameter and a 0.015 inch wall thickness. It also is preferably a single, continuous length of tube having one inlet and one outlet to eliminate complex inlet and outlet manifolds. It can be placed in a zig-zag or serpentine configuration with periodic bends therein to sweep it back and forth across the cooling member 41. The bends in tube 90 may occur outside the member 41, as shown in FIG. 4, or, alternatively, may occur within the member.

In the use of a Teflon tube in cooling assemblies, some consideration should be given to the pressure limits of the tube. A tube such as the type described immediately above was operated in a fuel cell having a normal operating temperature of about 350°–400° F. It was found that the specific tube used might burst if coolant pressures were maintained in the area of 100 psi and above. On the other hand, bursting did not occur when the pressure was maintained in a range up to approximately 50–60 psi.

The areas of the tube 90 which are bent can be made to bend as desired by any suitable means. For instance, the tube 90 can be manufactured to have predetermined bends in it such as approximately 180° before assembly with member 41. Its shape can conform to the serpentine arrangement it should follow to pass through channels 43 when the cooling assembly is put together. The tube 90 can also be made of a straight section of tubing which is bent into the serpentine arrangement during assembly with members 41. To ease the bending process, corrugated segments can be periodically arranged along its length to allow for short radius bending thereof without crimping or other damage or failure occurring to the tube as it is arranged within the predetermined channel pattern formed by members 41.

The corrugations are typically less than one or two inches in length and they permit a tight bending radius to allow a tightly-packed, zig-zag geometry that yields a high ratio of heat transfer area to total plate area. The bends can be 180° or some other angle to accommodate the pattern of sweeping the tube back and forth across members 41. One method of creating such corrugations is to apply a hot mandrel to those sections of the tube where the tube is to be bent. The tube material, such as Teflon, is thereby softened by the hot mandrel while also being constrained by the mandrel. The tube wall in this condition takes on a fluted (or corrugated) configuration.

Instead of corrugating tube 90 in its portions which are to be bent, other approaches can be used in bending the tube 90 to allow short radii without the risk of crimping the tube or causing other damage to it. One such approach is to provide a support means in the tube to guard against such damage. The internal support can be placed throughout the length of the tube or only at the locations at which the tube is to be bent. Such a support can be located entirely within the tube's central passageway that carries the coolant, and it can be an additional component assembled to the tube.

Figure 9:
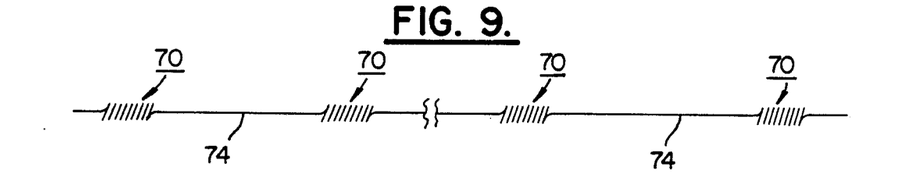
FIG. 9 is a schematic illustration of the coil pattern after the coil material is stretched out between those sections thereof to accommodate bends in the coolant tube.
Figure 10:
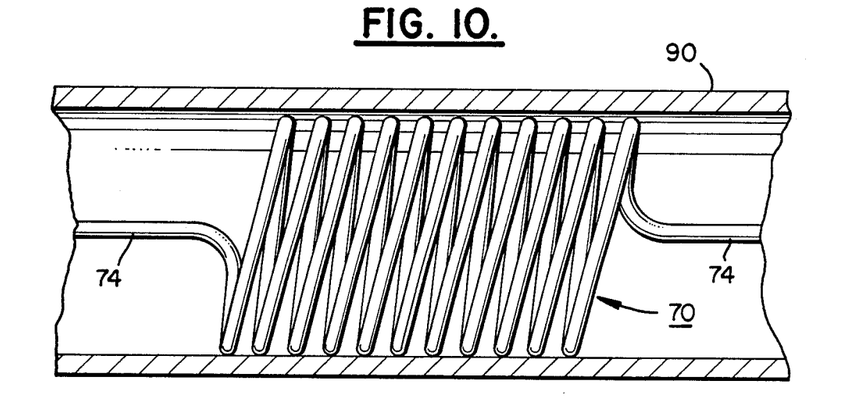
FIG. 10 is a schematic illustration of the coil support in the coolant tube before the tube is bent, the tube being partially cut away.
Figure 11:
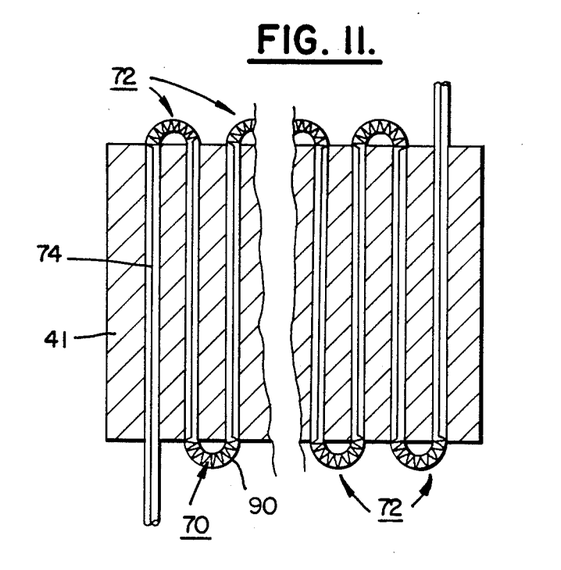
FIG. 11 is a schematic illustration of the coil support in a tube arranged in serpentine configuration.

A preferred type of internal support means is carried out by inserting wire coils inside the tube at the locations that the tube is to be bent. This is shown in FIGS. 9–11. Such coils 70 can have a diameter slightly less than the inside diameter of the tube 90 and enable the coolant to pass through inside diameter of the coil as well as around the coils and between the coils and tube wall. Coils have been found to prevent excess crimping in the tube wall when the tube is formed into short radius bends 72. The coils at the bends can be connected to one another by any suitable means such as by a straight section 74 of wire therebetween. The coils can be inserted into the tubing by their leading end and fully pushed into the entire length of the tube. In this manner, the tightly-wrapped coiled portions 70 are located in the areas 72 of the tube to be bent while the straight sections 74 are located along the tube between the bends.

The coils can be made of any suitable material. For instance, they can be safely made of a metallic material such as steel since they are completely located in the tube and, thus, are not exposed to the corrosive materials used in the fuel cell environment. The approach of using an internal support such as a coil in the tube is believed significantly less expensive to manufacture than the placement of corrugations in the tube material itself as described above. The shape, size and configuration of the internal support can be any suitable one so long as the coolant is allowed to flow in the tube as intended.

One manner of forming the metal coil internal support is to start with a length of tightly-wrapped coil or spring stock of an appropriate length and diameter and stretch out the coil material in conformance with the frequency of bends in the tube. A small, still tightly-wrapped length 70 can be left between each uncoiled section 74 sufficient to accommodate a bend in the tube. The portion of the coil support structure between the bends is then simply a straight uncoiled section of coil material joined to tightly-wrapped sections of coil at the bends. In this manner, the entire internal support can be made of a single continuous length of coil material.

The coil pattern; e.g., tightly-wrapped coil sections separated by uncoiled sections, could be manufactured by hand with suitable coil stretching and anchoring tools to match the intended configuration of the bends of the tube in the cooling assembly. To provide a coil pattern of greater dimensional control and accuracy, any conveniently available mechanism can be used. For instance, an ordinary lathe was used to process a length of tightly-wrapped coiled material into a coil pattern with sections of tightly-wrapped coil interspersed with uncoiled, stretched out lengths of coil material. The lathe was used simply as a holding and stretching device and not in its usual machining capacity.

The coil was placed in the chuck of the lathe with a section extending out towards the tools carriage along the lathe bed. A clamp or some other appropriate forcing device was attached to the extending section of the coil, but leaving a tightly coiled portion beyond. The clamp was then moved away from the chuck to stretch out the coil into a somewhat straight section so as to deform the coil material in that area. This provided a tightly-wrapped coil section separated from the rest of the coil by a relatively unwrapped or straight section of coil material. The coil stock was then loosened in the chuck and moved a bit to allow another tightly-wrapped coil section thereof to extend beyond the chuck. The clamp was then again fastened on the coil stock having a tightly-wrapped portion between it and the previously stretched out portion to be placed in a bend in the tube. After this section was stretched, the process was repeated until there were enough tightly-wrapped coiled sections of coil material between stretched out sections to accommodate all the bends in the tube.

The coil pattern manufactured in this manner was used in a cooling assembly with good results. There was enough space within the inner diameter of the coil so as not to unduly impede the flow of coolant. For instance, a tube having a nominal size of ¼ inch diameter was used, the inside diameter thereof being approximately 0.270 inches A coil having an outside diameter slightly less than the inside diameter of the tube and inside diameter of approximately 0.190–0.200 inches, made in the above-described manner, was screwed into a length of tube approximately 30 feet long. In using the tube with the coil inserted therein the pressure drop across the entire tube length was held to less than 20 psi.

In addition to the coil-type internal support, other types of internal supports can be used. For instance, an internal cylindrical or tube or member of other configuration could be placed in the coolant tube to ease crimping in the bend areas. Such an internal tube should be rigid so as not to overly restrict or impede coolant flow yet enable small radius bends in the coolant tube. Internal tubes for this purpose can be made out of any suitable material such as plastic or metal.

The channels 43 within members 41 can take any pattern which is suitable for cooling. The contour of the channels 43 may preferably have the shape that approximately conforms with the natural peripheral shape of tubes 90. This is so that when members 41 are placed over the tubes 90, there is an intimate surface-to-surface contact between the two components and a minimization of any air spaces or other voids therebetween. Any such gaps that might otherwise exist are closed by the tube conforming to the surface contour of the channels 43. The sizing of the channels 43 relative to the sizing of the tubes 90 may be such that the channel at least slightly compresses the tube periphery when the two are assembled into operating positions. Thus, the channel 43 takes on a shape which closely conforms to the tube 90 when the two are assembled together.

The cooling assembly 21 can be made as a separate unit from the individual cells of the fuel cell stack so that members 41 and conduit means 90 can be placed or inserted periodically along the stack to permit cooling. Alternatively, members 41 can be made part of or integral with the gas distribution plates of the fuel cell adjacent to the cooling assembly. In this configuration, two such stack portions having an integral member 41 on the end cell can be assembled with the cooling tubes to form a cooling assembly within the stack.

The function of the straight sections of tube 90 is to effect the transfer of heat from the grooved surfaces 43 in members 41 in which they are nestled. The members 41, containing the grooved surfaces, can be made of any solid, thermally and electrically conductive material, such as any material commonly used in hot fuel cell or battery plates.

Figure 6A:
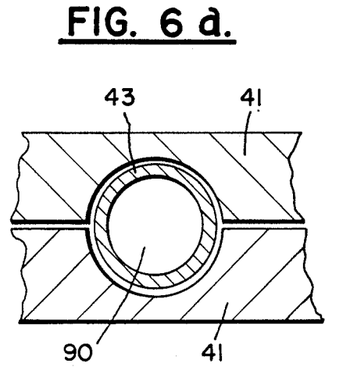
FIGS. 6(a) and 6(b) are views of the intimate contact between the conduit means and members of the cooling assembly.
Figure 6B:
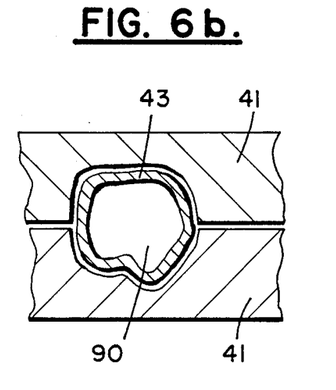

The grooves or channels 43 in member 41 can assume any suitable cross-section profile to accomplish the result desired. The channel shape can be formed to conform the tube 90 to its shape and thereby cause intimate contact therewith when assembled. For instance, the grooves in each member 41 can be cut in an approximately half-round or half-oval cross-section. The surfaces of the members 41 can then be mechanically pressed together with the grooves over the tube 90. The surfaces of the members between the grooves can be brought into contact, as shown in FIGS. 5-6, to create an electrical contact over the areas adjacent to the grooves. The half-oval grooves allow the cooling tube 90 to conform easily to the surface area of the grooves 43 and, thus, maintain thermal contact without impeding the electrical contact between members 41 or the flow of coolant within the cooling tube 90.

The shape or contour of channels 43 are subject to manufacturing variances. If non-conformable tubes 90 were used therein and large variances occurred in the dimensions and contour of the channels 43 or the tubes, rigid cooling tubes 90 would not conform to the manufactured shape of channel 43. This would create an air space produced between the tube 90 and groove 43. This problem is addressed in the background patents mentioned herein. These patents disclose the use of caulking material in the gaps to improve heat transfer. By using a conformable material for tube 90, such manufacturing variance problems would be automatically overcome by the tendency of the tube 90 to conform to the actual contour of channels 43.

FIGS. 6(a) and 6(b), show a semi-circular groove 43 in member 41 and a round coolant tube 90. If, after assembly of the cooling assembly 21, the coolant tube 90 fits perfectly within the surrounding grooves 43 in the two plates 41, good surface-to-surface contact occurs between groove 43 and the surface of tube 90. This condition is shown in FIG. 6(a). However, as shown in FIG. 6(b), if groove 43 is of different contour than the natural shape of the coolant tube 90, or vise versa, the tube 90 nevertheless conforms to the actual shape of groove 43 since it is conformable. Thus, intimate contact between the tube 90 and plate 41 is still accomplished after the cooling assembly is assembled for operation. The abnormalities in the surface or contour of groove 43 shown in FIG. 6(b) are greatly exaggerated for the purposes of clarity of this description.

A preferred embodiment of the grooves 43 is shown in FIGS. 7a-b and 8a-c. These figures which are enlarged schematic illustrations for clarity of description, are not to any scale and the components therein are not necessarily proportionally sized with accuracy with regard to one another. In this embodiment, the groove 43, when a cross-section thereof is viewed, takes on the contour or profile of a truncated half circle in each plate FIGS. 7a-b and 8a-c are partial cross sections of the cooling assembly similar to that shown in FIG. 5 When a conformable material is used for tube 90, a quasi-oval groove such as a truncated half circle, rather than a half oval or half circle has been found to be a very advantageous shape for the grooves 90 in plates 41.

Figure 7A:
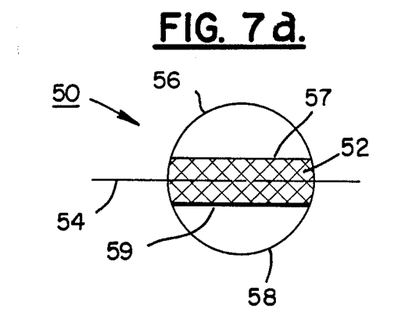
FIGS. 7(a) & 7(b) are schematic illustrations of the formation of the truncated half circle grooves.
Figure 7B:
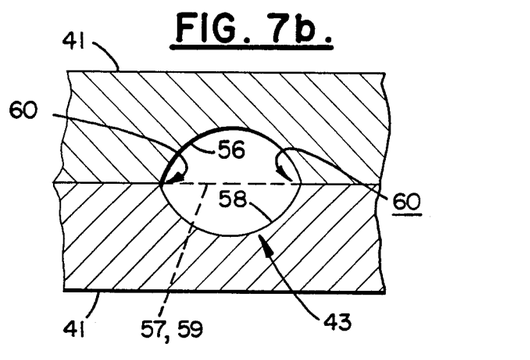

The term "truncated half circle" is described in conjunction with FIGS. 7a and b. FIG. 7a depicts the cross section of a circle contour 50 which, when used as is to form the grooves, produces a half circle groove in each plate. The circle 50 has a horizontal center line 54 dividing the circle into upper and lower halves. In order to form the truncated half circle groove, a portion 52 of the circle 50 is cut away as indicated by the cross hatched section of FIG. 7a. When this is done, the remaining portions of the upper and lower portions of the circle 50 are bounded by upper half portion 56 and truncated edge 57 and lower half portion 58 and truncated edge 59, respectively. Each of these forms a truncated half circle groove.

The plates 41 of the cooling assembly are assembled as shown in FIG. 7b and the upper and lower truncated half circle grooves in each plate 41, when fitted together to provide a channel for the tube (not shown), form a truncated circle contour for the channel. A feature of the truncated half circle grooves is that this shape provides room, at the edges 60 of the groove where the two plates 41 interface, for the walls of the tube to expand. Both the oval and truncated circle channel profiles provide much space which is used by the tube during the assembly and operation of the fuel cell. However, the use of the truncated circle profile in the channel provides optimum contact between the tubes' outer surface and the surface of the groove while also providing room for expansion, especially during operation of the cell.

Figure 8A:
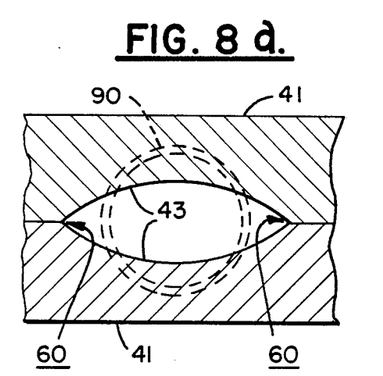
Figure 8B:
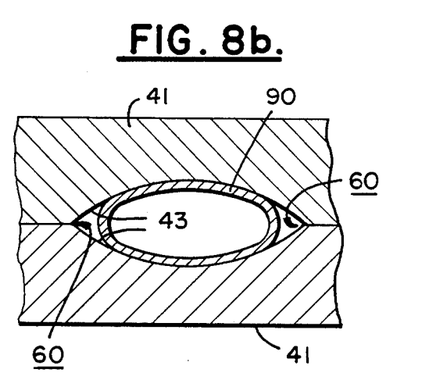
Figure 8C:
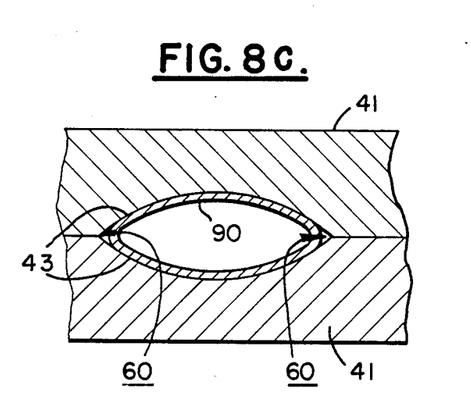

The interaction of the tube 90 with the truncated half circle grooves in each plate is shown in FIGS. 8a–c. FIG. 8a shows the shape of grooves 43 when plates 41 are assembled, but without the tube 90 within the channel provided by grooves 43. The cross-section of the tube 90 is, however, superimposed in dotted lines, over the groove 43 to schematically illustrate that the natural shape of tube 90 is altered in this embodiment of the invention when it is assembled with plates 41. FIG. 8b shows the tube 90 assembled with plates 41. The tube 90 takes the approximate shape shown. The fuel cell has not been placed in operation as yet and, thus, the grooves 43 still leave some room for expansion in the vicinity of edges 60.

FIG. 8c shows the grooves 41 and tube 90 when the fuel cell has been placed in operation and has heated up to its normal operating temperature. Coolant (not shown) is also flowing through the tube 90 in this view. During the time that the fuel cell is brought up to operating temperature the materials therein expand. When Teflon is used for the coolant tube 90, the Teflon expands faster and to a greater degree than the material of plates 41; e.g., a graphite plate. In addition, the coolant flows through the tube 90 with a pressure which tends to push against the interior wall of the tube 90 and expands its outer surface into the vicinity of edges 60.

It can be appreciated, in contrast, that when the grooves 43 are formed by half circles and the channel for the tube 90 is in the shape of a full circle when the plates 43 are assembled, there is no room for expansion of the tube 90. Thus, if the diameter of tube 90 is approximately the same size as the groove, there is little place for the tube 90 to expand when the cell is brought up to operating temperature and/or coolant is passed through the tube. Such expansion could force the plates 41 apart after assembly which would deteriorate the intended performance of the cell.

On the other hand, if the outer size of tube 90 was reduced relative to the groove size to allow adequate expansion room within the groove, the smaller tube would be able to flop around in the plates after assembly whenever the cell is not at full operating temperature. This is disadvantageous in that it may cause damage to the coolant tube, such as during shipping and handling of the fuel cell, and little of the tube's periphery would be continuously in place against the surface of grooves 43 at all times.

The sizes of the grooves 43 and outer diameter of tube 90 are to be chosen so that as much of the periphery of the tube as practical is in contact with the surface of the groove during operation of the cell. However, these sizes, necessarily, should not be such that the expansion of the tube due to the bringing of the cell to operating temperature and the passing coolant through the tube makes the tube force the plates 41 apart. In sizing these elements, it is preferable to leave a slight air gap between the groove edges 60 and the periphery of the tube 90 than risk separation of the plates. A small air gap, such as that shown in FIG. 8c, does not appreciably cut down on the passage of heat from the plates 43 to the coolant in the tube 90. It does, however, provide a reasonable manufacturing tolerance for the grooves and tube.

The actual size of the tube and the profile of the groove are intimately related to provide the desired surface contact between the two elements. These factors are dependant on the application also. The selection of the size of the tube depends, among other things, on the amount of coolant required and the thickness of the tube wall. Once these factors are decided upon and the peripheral size of the tube to be used is determined, the size of the periphery of the tube at cell operating temperature and with coolant therein can be determined. This, in turn, is taken into account along with the plate material used to determine the size of the groove to provide optimum contact between the groove and tube. The optimum system results when the tube has substantial contact with the groove when the cell is not at operating temperature, as shown in FIG. 8b, and almost, but not complete contact with the groove when the cell is at operating temperature, as shown in FIG. 8c. In this manner, certain areas of the tube's surface are always in contact with the surface of the groove thereby eliminating the possibility of new gaps being generated between the two as the fuel cell is cycled on and off or over a range of operating temperatures.

In the cooling assembly embodiment shown in FIG. 5, a polymeric cooling tube 90 is nestled between two grooved members 41 bonded to one another along two narrow strips adjacent to the edges parallel to the straight sections of the cooling tube. Cooling plate materials suitable for high temperature operation and corrosive environment would include strips of polyethersulfone film sandwiched between and bonded to two grooved members 41 made of graphitized or carbonized plates. An alternative embodiment is possible which holds the same grooved members 41 together mechanically until after they are assembled into a fuel cell stack of other device in need of cooling. Still another alternative assembly technique is to hold the plates together with the tube in the channel with a bonding medium such as dissolved polyethersulfone which is cured to an appropriate temperature.

The nature of the member 41 need not be constrained unduly. The shape of groove 43 could be constructed so as to deliberately conform the tube 90 into intimate surface contact with groove 43; for instance, an elongated or oval cross-section rather than circular. Also extremely hard materials need not be used for member 41. The materials used for member 41 in this configuration could be materials which in of themselves conform or collapse around the tube 90 so that intimate contact is fully reached with the tube. The cooling tube can be pressed into half-oval shape grooves cut out of whatever surface or surfaces are to be cooled. In this case, the cooling assembly 21 could consist merely of a Teflon tube and cooling fluid. The complete absence of metal would give this assembly corrosion resistance superior to that of metallic or partly metallic devices whether coated or not.

The cooling tubes themselves or the entire cooling assembly, can be made of a non-corroding material for use in a fuel cell stack. The primary advantages of this constriction are an easy and low cost fabrication, total safety against corrosion (nonmetallic) and total elimination of shunt currents between cooling plates in the stack without having to otherwise electrically isolate the cooling plates. The flexibility of the cooling tube also provides good thermal conduction thereto in of itself since it tends to be pressed up tightly against the surfaces of the grooves in the members 41. The tube assembly is temperature tolerant, totally corrosion resistant and totally impervious.

It is to understood that the above described embodiment of the invention is illustrative only, and that modifications thereof may occur to those skilled in the art. Accordingly, this invention is not to be regarded as limited to the embodiment as disclosed herein, but is to be limited only as defined by the appended claims.

What is claimed is:

1. Cooling assembly for use in removing heat from a fuel cell having means for circulating coolant through a cooling assembly adjacent the cell, the cooling assembly comprising:

(a) at least one comfortable coolant conduit means for carrying the coolant through the cooling assembly, and (b) means for holding the conduit means in the cooling assembly including at least one member which, when assembled with the conduit means, conforms at least a portion of the conduit means with its exterior surface in intimate contact with the interior surface of the member, the member including channel means therein to hold the coolant conduit means, the channel means shaped with its interior surface in a truncated half-circle contour so as to conform the coolant conduit means to the shape of the channel automatically when the member and coolant conduit means are assembled, the coolant conduit means comprising a non-corrodible, metal-free, dielectric material of a constant cross-sectional configuration in the area whereat it is held by the member.

2. The assembly of claim 1 wherein the cooling conduit means is a single continuous tube means having one inlet and one outlet for coolant.

3. The assembly of claim 2 wherein the coolant tube means is arranged in a serpentine configuration having periodic bends therein to increase the cooling capacity thereof over an area.

4. The assembly of claim 1 wherein the material is polytetrafluoroethylene.

5. Cooling apparatus for removing heat from a fuel cell stack having means for circulating coolant through a cooling assembly between two adjacent fuel cell units within the stack, each fuel cell unit having a plurality of laminated plate means which include a termination plate means at the extremity thereof, the cooling assembly comprising:

at least one conformable coolant conduit means, and (b) means for holding the conduit means in the cooling assembly including a member which, when assembled with the conduit means, conforms at least a portion of the conduit means with its exterior surface in intimate contact with the interior surface of the member, the means for holding the conduit means being integral with and forming part of the termination plate means of the fuel cell units adjacent the coolant conduit means, the member having channel means therein to hold the coolant conduit means, the channel means shaped with its interior surface in a truncated half-circle contour so as to conform the coolant conduit means to the shape of the channel automatically when the member and coolant conduit means are assembled, the conduit means comprising a non-corrodible, metal-free, dielectric material of a constant cross-sectional configuration in the area whereat it is held by the member.

6. The apparatus of claim 5 wherein the termination plate means has means for preventing the reactant gases of the fuel cell from reaching the means for holding the conduit means.

7. The apparatus of claim 5 having more than one comfortable coolant conduit means.

* * * * *